United States Patent [19]

Tomomura et al.

[11] Patent Number: 4,746,332
[45] Date of Patent: May 24, 1988

[54] PROCESS FOR PRODUCING HIGH PURITY NITROGEN

[75] Inventors: Masaomi Tomomura; Tetsuro Haga; Shunsuke Nogita, all of Hitachi; Kiyoshi Ichihara, Kudamatsu; Takazumi Ishizu, Hikari, all of Japan

[73] Assignee: Hitachi, Ltd., Tokyo, Japan

[21] Appl. No.: 911,451

[22] Filed: Sep. 25, 1986

[30] Foreign Application Priority Data

Sep. 27, 1985 [JP] Japan .................. 60-212657

[51] Int. Cl.$^4$ ............................. B01D 53/22
[52] U.S. Cl. .......................... 55/62; 55/68; 55/75; 62/18
[58] Field of Search ............. 55/62, 68, 75; 62/18

[56] References Cited

U.S. PATENT DOCUMENTS

| | | | |
|---|---|---|---|
| 2,882,243 | 4/1959 | Milton | 55/75 X |
| 2,893,512 | 7/1959 | Armond | 55/75 X |
| 2,930,447 | 3/1960 | Barrer | 55/75 X |
| 3,011,589 | 12/1961 | Meyer | 55/75 X |
| 3,023,841 | 3/1962 | Milton et al. | 55/75 X |
| 3,078,638 | 2/1963 | Milton | 55/75 X |
| 3,140,931 | 7/1964 | McRobbie | 55/58 X |
| 3,242,645 | 3/1966 | de Montgareuil et al. | 55/75 X |
| 3,331,213 | 7/1967 | Harmens | 55/75 X |
| 3,971,640 | 7/1976 | Golovko | 55/75 X |
| 4,239,509 | 12/1980 | Bligh et al. | 55/75 X |
| 4,380,457 | 4/1983 | Rathborne et al. | 62/18 X |
| 4,453,952 | 6/1984 | Izumi et al. | 55/75 X |
| 4,595,405 | 6/1986 | Agrawal et al. | 62/18 |

Primary Examiner—Robert Spitzer
Attorney, Agent, or Firm—Antonelli, Terry & Wands

[57] ABSTRACT

Nitrogen having purity of 99.9999% or more can be produced continuously by contacting a starting gas mixture comprising 90% by volume or more of nitrogen and 10% by volume or less of oxygen with A-type zeolite package in an adsorption column at an adsorption temperature of −100° to −196° C. to remove oxygen from the starting gas mixture and regenerating A-type zeolite by heating it at a temperature higher than the adsorption temperature.

5 Claims, 4 Drawing Sheets

PROCESS FOR PRODUCING HIGH PURITY NITROGEN

BACKGROUND OF THE INVENTION

This invention relates to a process for producing remarkably high purity nitrogen by adsorption at a low temperature using a starting gas mixture comprising 90% or more of nitrogen and 10% or less of oxygen.

Recent progress in semiconductor industry requires nitrogen having purity of 99.9999% or more in order to avoid undesirable effects of oxygen in the production of high performance semiconductors.

In order to produce high purity nitrogen, there is known a low temperature separation method wherein air is liquefied and purified to yield nitrogen of 99.999% to 99.9999%. But according to this method, the purity of more than 99.9999% can only be obtained by using several tens of rectifying plates. This means that a huge rectifying column is required, which results in increasing in plant cost or becoming uneconomical from the viewpoint of running cost.

Another method for producing high purity nitrogen from air is a pressure swing adsorption method (hereinafter referred to as "PSA method") using a molecular sieving carbon (MSC) for selectively adsorbing oxygen rather than nitrogen. Processes for producing the adsorbent MSC are disclosed in, for example, Japanese Patent Examined Publication Nos. 54-17595 and 49-37036 and Japanese Patent Unexamined Publication No. 59-45914. But according to the PSA method, the purity of nitrogen produced is as low as 99% to 99.9%, so that it is impossible to obtain nitrogen having purity of 99.9999% or more.

On the other hand, the use of A-type zeolite as an adsorbent is disclosed in Japanese Patent Examined Publication No. 55-16088 (U.S. Pat. No. 2,810,454). But according to this reference, argon is purified from a mixture of argon and a very small amount of oxygen by adsorbing the oxygen with A-type zeolite. When nitrogen is included in the mixture of argon and oxygen, the nitrogen is removed by fractional distillation prior to the separation of oxygen. There is no data as to adsorption of an oxygen-nitrogen system nor inventive idea of purifying nitrogen in this reference.

SUMMARY OF THE INVENTION

It is an object of this invention to provide a process for producing nitrogen having purity of 99.9999% or more with a simplified small apparatus overcoming disadvantages of prior art processes.

This invention provides a process for producing nitrogen having purity of 99.9999% or more, which comprises (a) an adsorption step of contacting a starting gas mixture comprising 90% by volume or more of nitrogen and 10% by volume or less of oxygen with A-type zeolite as an adsorbent packed in an adsorption column at an adsorption temperature of $-100°$ to $-196°$ C. to remove oxygen from the starting gas mixture by adsorption and to give remarkably high purity nitrogen, and (b) a desorption step of heating the adsorption column at a temperature higher than the adsorption temperature to desorb the adsorbed oxygen from the adsorbent for regeneration.

DESCRIPTION OF THE PREFERRED EMBODIMENTS

Figure 1:
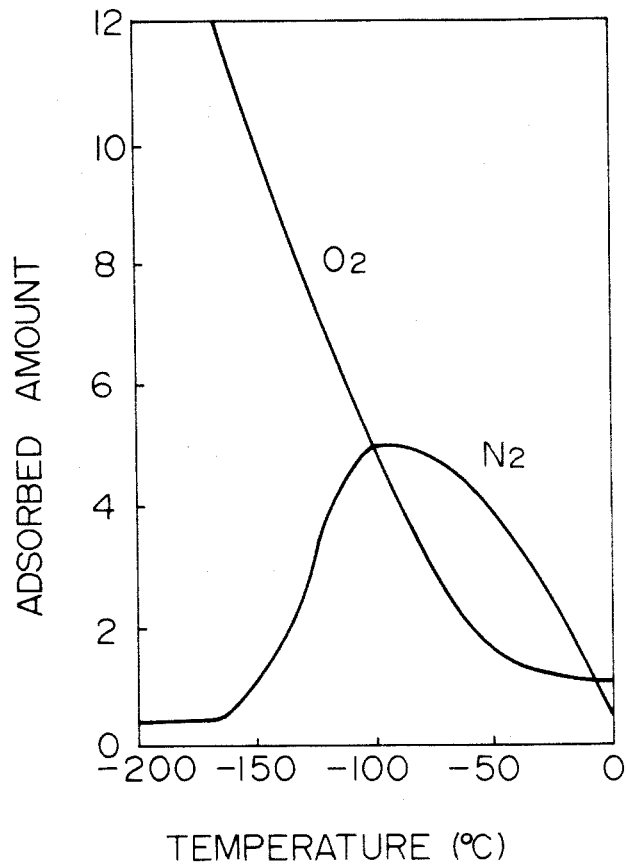
FIGS. 1 and 2 are graphs showing the principle of the process of this invention.
Figure 2:
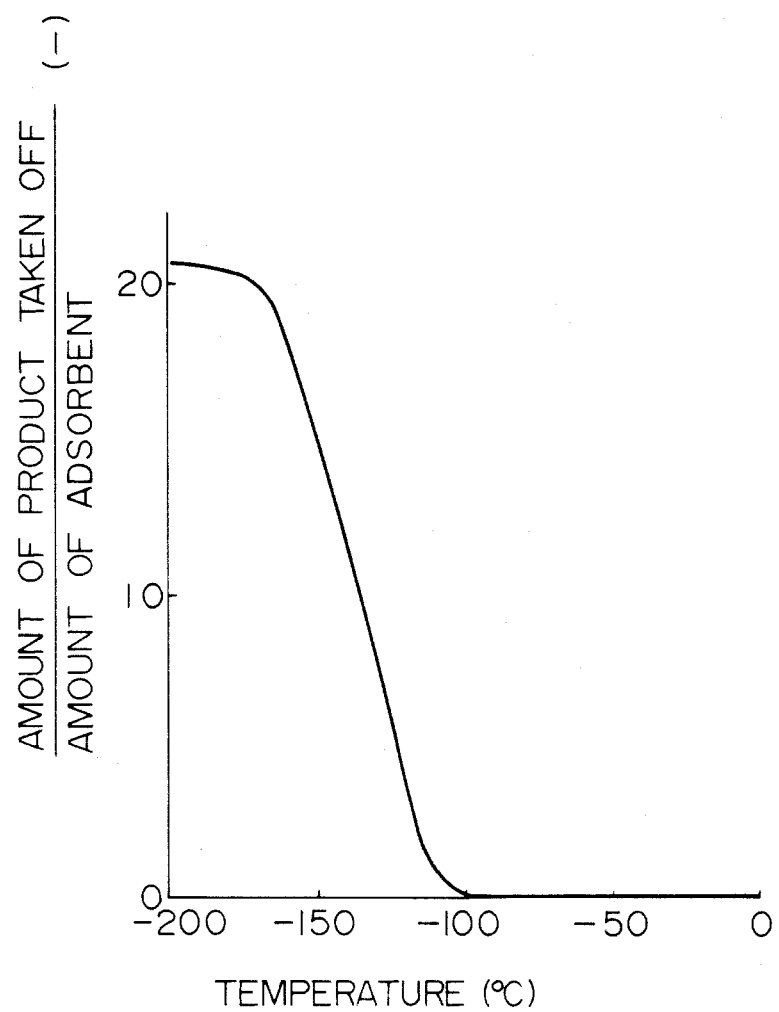

The principle of the process of this invention is explained referring to FIGS. 1 and 2.

FIG. 1 is a graph showing adsorption properties of nitrogen and oxygen on A-type zeolite in the temperature range of $0°$ to $-196°$ C., taking the adsorbed amount (number of molecules adsorbed per cavity of A-type zeolite) along the ordinate axis and the temperature along the abscissae axis. As is clear from FIG. 1, the adsorbed amount of nitrogen is more than that of oxygen in the temperature of $0°$ to $-100°$ C.; that is, the A-type zeolite acts as a selective adsorbent for nitrogen. On the other hand, the adsorbed amount of nitrogen decreases at temperatures of $-100°$ C. or lower and the A-type zeolite acts as a selective adsorbent for oxygen. This tendency continues to the boiling point of nitrogen, i.e. $-196°$ C.

FIG. 2 is a graph showing a relationship between the amount of product (nitrogen) gas containing 0.1 ppm or less of oxygen taken off per amount of adsorbent and the adsorption temperature when a starting gas mixture comprising nitrogen and 500 ppm of oxygen is passed through A-type zeolite (adsorbent). As is clear from FIG. 2, nitrogen containing 0.1 ppm or less of oxygen ($N_2$ purity: 99.9999% or more) cannot be obtained at a temperature of higher than $-100°$ C. On the other hand, the taken out amount of product gas ($N_2$ containing 0.1 ppm or less of $O_2$) increases remarkably at a temperature of $-100°$ C. or lower to $-170°$ C. When the adsorption temperature is $-170°$ C. to $-196°$ C., the taken out amount of product does not increase remarkably. Considering the efficiency of production, the adsorption temperature of $-100°$ C. to $-196°$ C. is necessary, and the adsorption temperature of $-150°$ C. to $-196°$ C. is preferable. Economically, the adsorption temperature of about $-170°$ C. or lower (e.g. $-180°$ C.) is more preferable.

As the starting gas mixture, there can be used a gas mixture comprising 90% by volume or more of nitrogen and 10% by volume or less of oxygen, preferably 99% by volume or more of nitrogen and 1% by volume or less of oxygen, more preferably 99.9% by volume or more of nitrogen and 0.1% by volume or less of oxygen.

Such a starting gas mixture can be obtained by a conventional PSA method and a conventional low temperature separation method. Since a gas mixture comprising 99.9% by volume of nitrogen and 0.1% by volume of oxygen can easily obtained by the low temperature separation method with a low cost, the use of gas mixture obtained from the low temperature separation method is preferable from the viewpoint of effective production of highly pure nitrogen.

As the adsorbent, synthesized A-type zeolite is used. There are known Na-A type and Ca-A type zeolites depending on pore diameter of 4 Å and 5 Å, respectively. Ca-A type zeolite has a remarkably large adsorption capacity as to nitrogen, so that it is practically used for selectively removing nitrogen to separate oxygen. On the other hand, Na-A type zeolite adsorbs nitrogen at room temperature but increases the adsorbing amount of oxygen at lower temperatures as shown in FIG. 1. Thus, the use of Na-A type zeolite is preferable in this invention.

The adsorption step of this invention comprises introducing the starting gas mixture into an adsorption column packed with A-type zeolite as an adsorbent at a space velocity of preferably 1000 to 8000 h$^{-1}$ so as to contact the starting gas mixture with A-type zeolite at an adsorption temperature of $-100°$ C. to $-196°$ C. to remove oxygen by adsorption. The starting gas mixture is slightly compressed, for example, at a pressure of 0.5 to 5 kg/cm$^2$.G.

The desorption step of this invention comprises heating the adsorption column at a temperature higher than the adsorption temperature to desorb the adsorbed oxygen from the adsorbent for regeneration. More concretely, the desorption temperature is preferably 0° C. to 100° C., more preferably 10° C. to 30° C. The heating of the adsorption column can be conducted by using a heater or desorbed gases such as a waste nitrogen gas of room temperature or heated, or the like.

According to this invention, nitrogen having purity of 99.9999% or more can be produced continuously by using alternately a pair of adsorption columns connected in parallel. When the purity of nitrogen in the starting gas mixture is rather low, two or more adsorption columns connected in series can be used.

Figure 3:
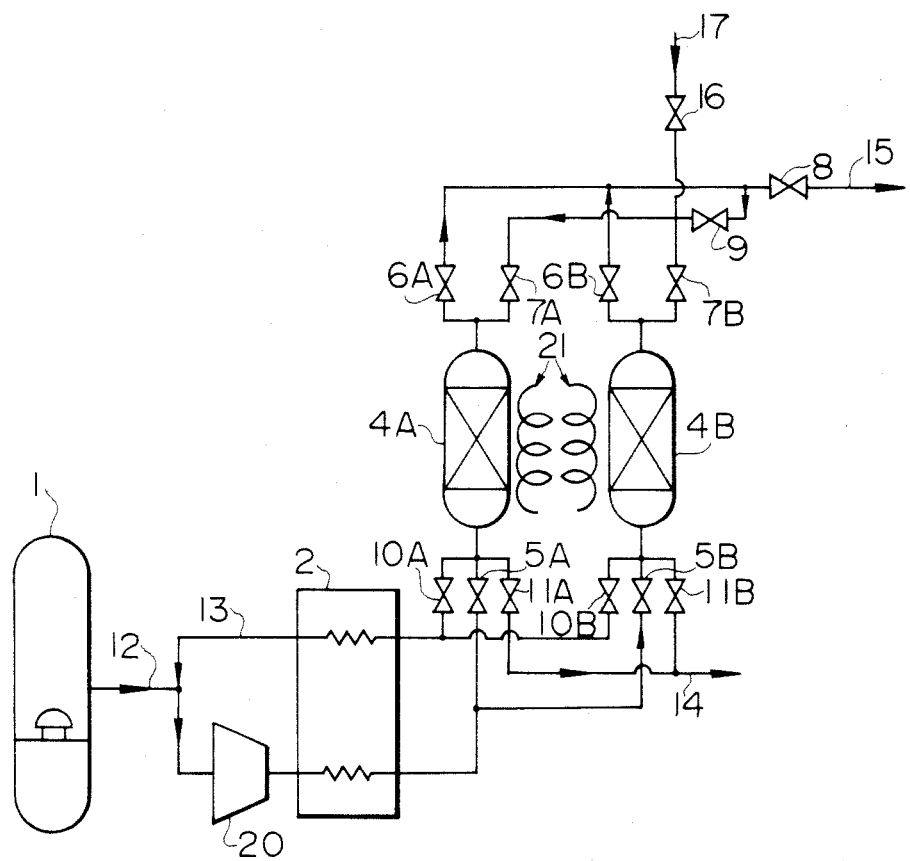
FIGS. 3 and 4 are flow sheets illustrating a series of steps embodying this invention.

One embodiment of this invention is illustrated by referring to an apparatus shown in FIG. 3.

In FIG. 3, a starting gas mixture comprising nitrogen (90% or more) and oxygen (10% or less) is passed from a rectifying column 1 (e.g. of a low temperature separation method) to a heat exchanger 2 via a pipe 12 and a compressor 20 to be cooled at about $-170°$ C. The cooled starting gas mixture is introduced into a first adsorption column 4A via a valve 5A. In the first adsorption column 4A and a second adsorption column 4B, A-type zeolite is packed and maintained at the same temperature (about $-170°$ C.) as the cooled starting gas mixture. From the starting gas mixture fed to the first adsorption column 4A, oxygen is removed by adsorption by the A-type zeolite and highly pure product nitrogen is taken out via a valve 6A, valve 8 and pipe 15.

Immediately before the adsorbent in the first adsorption column 4A is saturated with oxygen and nitrogen, the supply of the starting gas mixture to the first adsorption column 4A is exchanged to the second adsorption column 4B by operating valve 5B. In the second adsorption column, the same adsorption operation as in the first adsorption column is conducted to yield highly pure product nitrogen via the valves 6B and 8 and pipe 15.

At the same time, the first adsorption column is subjected to a desorption step. That is, the valves 5A and 6A are closed and a valve 10A is opened gradually. The inside of the first adsorption column is heated with a heater 21 to about room temperature. With an increase of the temperature, the oxygen adsorbed in the A-type zeolite and nitrogen retained in the first adsorption column 4A are flowed therefrom via the valve 10. The flowed-out desorption gas comprising oxygen and nitrogen is introduced into the heat exchanger 2 and heat exchanged with the starting gas mixture. Then, the flowed-out desorption gas is passed to the compressor 20 via a pipe 13. When the pressure of the first adsorption column 4A is further lowered, the above-mentioned flowed-out desorption gas contains almost no nitrogen and substantially only oxygen. At this time, the valve 10 is closed and a valve 11A is opened to pass the flowed-out desorption gas containing only oxygen for purging via a pipe 14. That is, a part of product nitrogen is introduced into the first adsorption column 4A via valves 9 and 7A, or pure nitrogen is introduced via a pipe 17 and a valve 16 from the outside of the system into the first adsorption column 4A, to purge the residual oxygen adsorbed on the adsorbent. After the purging, a waste gas comprising oxygen and nitrogen is exhausted via the valve 11A and the pipe 14. By the above operation, the first adsorption column is regenerated and can be used for the next adsorption operation. The regeneration of the second adsorption column can be carried out in the same manner as mentioned above. In a desorption step of the second adsorption column 4B, a valve 6B is closed. Further, a portion of the product nitrogen is introduced into the second adsorption column via a valve 7B.

By conducting the adsorption and desorption operations with alternative exchange of the use of the first adsorption column 4A and the second adsorption column 4B, the product nitrogen having purity of 99.9999% or more can be produced continuously. Further, when the flowed-out desorption gas from the adsorption columns 4A and 4B in the initial stage of the desorption step is returned to the starting gas mixture system, almost all of the nitrogen gas in the flowed-out desorption gas can be recovered. When nitrogen is almost not contained in the flowed-out desorption gas, the flowed-out desorption gas is exhausted outside of the system via the valve 11A or 11B and the pipe 14. The exchange of the flowed-out gas routes depending on the nitrogen content can be carried out by detecting the oxygen or nitrogen content in the flowed-out gas and operating the valve 10A or 10B, or valve 11A or 11B. But when the starting gas mixture composition is constant, the above-mentioned valves can be operated automatically by a time control, since the flowed-out time becomes almost constant.

In the desorption step (regeneration step) mentioned above, only a gas having a higher nitrogen content flowed out in the initial stage is returned to the starting gas mixture system, but all the gas flowed-out through the desorption step can be returned to the starting gas mixture system.

Figure 4:
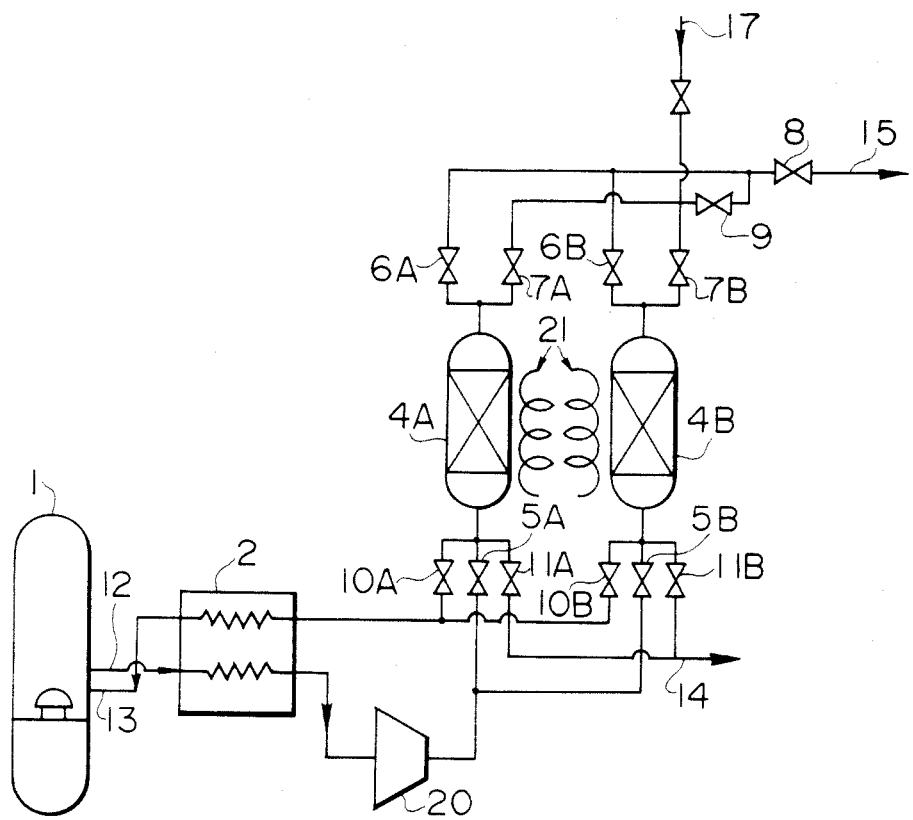

Another embodiment of this invention can be illustrated by referring to an apparatus shown in FIG. 4. In FIG. 4, the same reference numerals as used in FIG. 3 are used for the same constituting parts.

In FIG. 4, a starting gas mixture comprising nitrogen (90% or more) and oxygen (10% or less) is passed from a middle plate in a rectifying column 1 (e.g. of a low temperature separation method) to a heat exchanger 2 via pipe 12. After being heated in the heat exchanger 2, the starting gas mixture is compressed in a compressor 20 at a pressure of 0.5 to 5 kg/cm$^2$.G. A first adsorption column 4A and a second adsorption column 4B are packed with A-type zeolite and maintained at a temperature of about $-170°$ C., which temperature is the same as that of the starting gas mixture. The starting gas mixture supplied to the first adsorption column 4A from a valve 5A is contacted with the adsorbent to remove oxygen by adsorption and the product nitrogen having purity of 99.9999% or more is yielded via a valve 6A, valve 8 and pipe 15.

Immediately before the adsorbent in the first adsorption cloumn 4A is saturated with oxygen and nitrogen, the supply of the starting gas mixture is changed from the first adsorption column 4A to the second adsorption column 4B by operating valves. In the second adsorption column 4B, the same adsorption operation as mentioned above is carried out to yield the product nitrogen having purity of 99.9999% or more via the valve 8.

At the same time, the first adsorption column 4A is subjected to a desorption step. That is, the valves 5A and 6A are closed and the valve 10A is gradually opened. The inside of the first adsorption column 4A is heated with a heater 21 to about room temperature. With an increase of the temperature, the oxygen adsorbed in the A-type zeolite and nitrogen retained in the first adsorption column 4A are flowed therefrom via the valve 10A. The flowed-out desorption gas containing oxygen and nitrogen is introduced into the heat exchanger 2, heat exchanged with the starting gas mixture therein and returned to the rectifying column 1 via a pipe 13. When the pressure of the first adsorption column 4A is further lowered, the flowed-out desorption gas contains almost no nitrogen and substantially oxygen alone. At this time, the valve 10A is closed and the valve 11A is opened to exhaust the flowed-out gas containing only oxygen via the valve 11A and pipe 14. That is, a part of the product nitrogen is introduced into the first adsorption column 4A via the valves 9 and 7A to purge the residual oxygen adsorbed on the adsorbent. After the purging, a waste gas containing oxygen and nitrogen is exhausted via the valve 11A and the pipe 14. By the above-mentioned operation, the first adsorption column 4A is regenerated and can be used for the next adsorption operation. The regeneration of the second adsorption column can be carried out in the same manner as mentioned above.

By conducting the adsorption operation and desorption operation with alternative exchange of the use of the first adsorption column 4A and the second adsorption column 4B, the product nitrogen having purity of 99.9999% or more can be produced continuously. Further, when the flowed-out desorption gas from the adsorption columns 4A and 4B in the initial stage of the desorption step is returned to the rectifying column 1, almost all of the nitrogen gas in the flowed-out desorption gas can be recovered. When nitrogen is almost not contained in the flowed-out desorption gas, the flowed-out desorption gas is exhausted outside of the system via the valve 11A or 11B and the pipe 14. The exchange of the flowed-out gas routes depending on the nitrogen content can be carried out by detecting the oxygen or nitrogen content in the flowed-out gas and operating the valve 10A or 10B, or valve 11A or 11B. But when the starting gas mixture composition is constant, the above-mentioned valves can be operated automatically by a time control, since the flowed-out time becomes almost constant.

In the desorption step (regeneration step) mentioned above, only the flowed-out gas in the initial stage is returned to the rectifying column, but all the flowed-out gas through the desorption step can be returned to the rectifying column.

This invention is illustrated by way of the following Examples.

EXAMPLE 1

Using the apparatus shown in FIG. 3, highly pure nitrogen was produced by using as a starting gas mixture that obtained from a rectifying column used in an air low temperature separation method. The operational conditions used therein are shown in Table 1.

TABLE 1

| Starting gas composition | | $N_2$ 99.95%, $O_2$ 0.05% |
|---|---|---|
| Temperature | Adsorption | $-170°$ C. |
| | Desorption | $25°$ C. |
| Space velocity | | 2000 $h^{-1}$ |
| Volume of adsorption column | | 0.5 liter |
| Operational pressure | | 0.5–5 $kg/cm^2 \cdot G$ |

The product nitrogen had purity of 99.9999% or more and contained oxygen in an amount of 0.1 ppm or less.

EXAMPLE 2

Using the apparatus shown in FIG. 4, highly pure nitrogen is produced by using as a starting gas mixture that obtained from a rectifying column used in the air low temperature separation method. The operational conditions used therein were the same as those used in Example 1.

The product nitrogen had purity of 99.9999% or more and contained oxygen in an amount of 0.1 ppm or less.

The low temperature separation method for producing highly pure nitrogen by cooling nitrogen and oxygen at remarkably low temperatures has disadvantages in that the number of plates used in rectifying column should be increased remarkably, which results in making the separating equipment large, making the plant cost and running cost large and making the process uneconomical. In contrast, according to this invention, highly pure nitrogen can be produced continuously by only adding an adsorption column packed with A-type zeolite to a conventional size rectifying column of the low temperature separation apparatus. Since it is not necessary to make the rectifying column large according to this invention, a more compact separating apparatus can be provided. Further, when a part of flowed-out desorption gas containing nitrogen in a large amount or all the flowed-out desorption gas is returned to the starting gas mixture system, the loss of nitrogen becomes small and the recovery rate of nitrogen increases.

What is claimed is:

1. A process for producing nitrogen having purity of 99.9999% or more, which comprises
   (a) adsorption step of contacting a starting gas mixture that is one obtained from a rectifying column in a low temperature separating apparatus for air and that comprises 99.9% by volume or more of nitrogen and 0.1% by volume or less of oxygen with A-type zeolite as an adsorbent packed in an adsorption column at an adsorption temperature of $-100°$ to $-196°$ C. to remove oxygen from the starting gas mixture by adsorption and to give highly pure nitrogen, and
   (b) a desorption step of heating the adsorption column at a temperature higher than the adsorption temperature to desorb the adsorbed oxygen from the adsorbent for regeneration; a gas containing a large amount of nitrogen flowing out of an adsorption column being returned to the rectifying column or to a starting gas mixture supplying portion and a gas containing a small amount of nitrogen flowed out of the adsorption column being exhausted outside of the system.

2. A process for producing nitrogen having purity of 99.9999% or more, which comprises
   (a) adsorption step of contacting a starting gas mixture that is one obtained from a rectifying column in a low temperature separating apparatus for air and that comprises 99.9% by volume or more of nitrogen and 0.1% by volume or less of oxygen with a A-type zeolite as an adsorbent packed in an adsorption column at an adsorption temperature of $-100°$ to $-196°$ C. to remove oxygen from the starting gas mixture by adsorption and to give highly pure nitrogen, and (b) a desorption step of heating the adsorption column at a temperature higher than the adsorption temperature to desorb the adsorbed oxygen from the adsorbent for regeneration; all the gas flowed out of an adsorption column being returned to the rectifying column or to a starting gas mixture supplying portion.

3. A process for producing nitrogen having purity of 99.9999% or more, which comprises (a) an absorption step of contacting a starting gas mixture comprising 90% by volume or more of nitrogen and 10% by volume or less of oxygen with A-type zeolite as an adsorbent packed in an adsorption column at an adsorption temperature of $-100°$ to $-196°$ C. to remove oxygen from the starting gas mixture by adsorption and to give remarkably high pure nitrogen, and (b) a desorption step of heating the adsorption column at a temperature from 10° to 30° C. to desorb the adsorbed oxygen from the adsorbent for regeneration; the starting gas mixture being one obtained from a rectifying column in a low temperature separation apparatus for air, a gas containing a large amount of nitrogen flowed out of an adsorption column being returned to the rectifying column or to a starting gas mixture supplying portion and a gas containing a small amount of nitrogen flowed out of the adsorption column being exhausted outside the system.

4. A process for producing nitrogen having purity of 99.9999% or more, which comprises (a) an absorption step of contacting a starting gas mixture comprising 90% by volume or more of nitrogen and 10% by volume or less of oxygen with A-type zeolite as an adsorbent packed in an adsorption column at an adsorption temperature of $-100°$ to $-196°$ C. to remove oxygen from the starting gas mixture by adsorption and to give remarkably high pure nitrogen, and (b) a desorption step of heating the adsorption column at a temperature from 10° to 30° C. to desorb the adsorbed oxygen from the adsorbent for regeneration; the starting gas mixture being one obtained from a rectifying column in a low temperature separation apparatus for air and all the gas flowed out of an adsorption column being returned to the rectifying column or to a starting gas mixture supplying portion.

5. A process according to claim 4, wherein the starting gas mixture comprises 99% by volume or more of nitrogen and 1% by volume or less of oxygen.

* * * * *